United States Patent
Lau et al.

(10) Patent No.: US 10,624,012 B2
(45) Date of Patent: Apr. 14, 2020

(54) HANDING OVER A USER DEVICE FROM ONE TECHNOLOGY TO ANOTHER

(71) Applicants: Verizon Patent and Licensing Inc., Arlington, VA (US); Cellco Partnership, Arlington, VA (US)

(72) Inventors: Priscilla Lau, Fremont, CA (US); Patricia R. Chang, San Ramon, CA (US); Arda Aksu, Martinez, CA (US); Jay J. Lee, San Ramon, CA (US); Lalit R. Kotecha, San Ramon, CA (US); Thomas H. Tan, San Jose, CA (US); Maria G. Lam, Oakland, CA (US); Steven R. Rados, Danville, CA (US); John F. Macias, Antelope, CA (US); Derek Hongwei Bao, Concord, CA (US)

(73) Assignees: CELLCO PARTNERSHIP, Basking Ridge, NJ (US); VERIZON PATENT AND LICENSING INC., Basking Ridge, NJ (US)

( * ) Notice: Subject to any disclaimer, the term of this patent is extended or adjusted under 35 U.S.C. 154(b) by 44 days.

(21) Appl. No.: 16/039,130

(22) Filed: Jul. 18, 2018

(65) Prior Publication Data
US 2018/0324666 A1     Nov. 8, 2018

Related U.S. Application Data

(60) Division of application No. 15/232,360, filed on Aug. 9, 2016, now Pat. No. 10,104,590, which is a continuation of application No. 14/218,853, filed on Mar. 18, 2014, now Pat. No. 9,479,985, which is a continuation of application No. 13/336,442, filed on Dec. 23, 2011, now Pat. No. 8,705,490.

(51) Int. Cl.
| | |
|---|---|
| *H04W 88/06* | (2009.01) |
| *H04W 36/22* | (2009.01) |
| *H04W 36/14* | (2009.01) |
| *H04W 36/24* | (2009.01) |
| *H04L 12/26* | (2006.01) |

(52) U.S. Cl.
CPC ............ *H04W 36/22* (2013.01); *H04L 43/16* (2013.01); *H04W 36/14* (2013.01); *H04W 36/24* (2013.01); *H04W 88/06* (2013.01)

(58) Field of Classification Search
CPC ..... H04W 36/22; H04W 36/14; H04W 36/24; H04L 43/16
See application file for complete search history.

(56) References Cited

U.S. PATENT DOCUMENTS

| | | |
|---|---|---|
| 6,594,241 B1 | 7/2003 | Malmlof |
| 6,889,050 B1 | 5/2005 | Willars et al. |
| 7,916,642 B2 | 3/2011 | Chowdury et al. |

(Continued)

*Primary Examiner* — Lan-Huong Truong

(57) ABSTRACT

A system may be configured to identify that a user device is connected to a first radio access network ("RAN"), via a first technology; and to identify that the user device is capable of accessing a second RAN, via a second technology. The system may further be configured to instruct the user device to concurrently connect to the second RAN and the first RAN, send or receive a first type of traffic via the first RAN, and send or receive a second type of traffic via the second RAN.

20 Claims, 10 Drawing Sheets

(56) References Cited

U.S. PATENT DOCUMENTS

| | | | |
|---|---|---|---|
| 8,125,956 B2 * | 2/2012 | Reddy | H04W 36/00835 370/331 |
| 8,130,655 B2 * | 3/2012 | Foottit | H04L 47/12 370/230 |
| 8,320,272 B2 * | 11/2012 | Kahn | H04L 12/5692 370/252 |
| 8,363,622 B1 | 1/2013 | Oroskar et al. | |
| 8,553,554 B2 | 10/2013 | Kahn et al. | |
| 8,797,875 B2 | 8/2014 | Garcia Martin et al. | |
| 2002/0160785 A1 | 10/2002 | Ovesjo et al. | |
| 2003/0050063 A1 | 3/2003 | Faerber | |
| 2005/0202828 A1 | 9/2005 | Pecen et al. | |
| 2006/0276190 A1 | 12/2006 | Shaheen | |
| 2007/0165537 A1 | 7/2007 | Magnusson et al. | |
| 2008/0192638 A1 | 8/2008 | Massiera et al. | |
| 2009/0017823 A1 | 1/2009 | Sachs et al. | |
| 2009/0046596 A1 * | 2/2009 | Ewe | H04W 36/0033 370/252 |
| 2010/0105376 A1 | 4/2010 | Choudhary | |
| 2010/0248739 A1 | 9/2010 | Westerberg et al. | |
| 2010/0267383 A1 | 10/2010 | Konstantinou et al. | |
| 2011/0058520 A1 | 3/2011 | Keller et al. | |
| 2011/0165875 A1 | 7/2011 | Wu | |
| 2011/0182235 A1 | 7/2011 | Shaheen et al. | |
| 2011/0222406 A1 | 9/2011 | Persson et al. | |
| 2011/0256894 A1 | 10/2011 | Khandelia et al. | |
| 2011/0258327 A1 * | 10/2011 | Phan | H04W 76/14 709/227 |
| 2012/0063419 A1 | 3/2012 | Zhao et al. | |
| 2012/0184327 A1 | 7/2012 | Love et al. | |
| 2012/0214541 A1 | 8/2012 | Narasimha et al. | |
| 2012/0275323 A1 * | 11/2012 | Reznik | H04L 47/10 370/252 |
| 2012/0314568 A1 | 12/2012 | Tan et al. | |
| 2013/0010656 A1 * | 1/2013 | Chin | H04W 48/18 370/280 |
| 2013/0065525 A1 | 3/2013 | Kiukkonen et al. | |
| 2013/0072186 A1 * | 3/2013 | Picker | H04W 8/12 455/432.1 |
| 2013/0084878 A1 | 4/2013 | Chen et al. | |
| 2013/0137393 A1 * | 5/2013 | Sverdlov | H04M 15/8044 455/406 |

\* cited by examiner

HANDING OVER A USER DEVICE FROM ONE TECHNOLOGY TO ANOTHER

CROSS-REFERENCE TO RELATED APPLICATIONS

This application is a Divisional of U.S. patent application Ser. No. 15/232,360, titled "Handing over a User Device from One Technology to Another," filed Aug. 9, 2016, which is a Continuation of U.S. patent application Ser. No. 14/218,853, titled "Handing over a User Device from One Technology to Another," filed Mar. 18, 2014, which is a Continuation of U.S. patent application Ser. No. 13/336,442, titled "Handing over a User Device from One Technology to Another," filed Dec. 23, 2011 (now U.S. Pat. No. 8,705,490, issued Apr. 22, 2014), the contents of which are hereby incorporated by reference in their entirety.

BACKGROUND

Wireless service providers (such as cellular service providers) may provide many different wireless technologies at any given time. In order to provide these technologies, wireless service providers may provide one or more radio access networks ("RANs") to which wireless devices, such as telephones, may wirelessly connect. Different RANs may correspond to different wireless technologies, and/or one RAN may correspond to multiple different wireless technologies. Thus, at any given time, multiple different wireless technologies may be available, through which a user device may connect to a network via a RAN.

DETAILED DESCRIPTION OF PREFERRED EMBODIMENTS

The following detailed description refers to the accompanying drawings. The same reference numbers in different drawings may identify the same or similar elements.

A system and/or method, described herein, may enable a user device (e.g., a cellular telephone, a personal digital assistant ("PDA"), a tablet computer, a laptop computer, etc.) to use various different technologies associated with radio access networks ("RANs"), which may include evolved NodeB, Base Transceiver Stations, WiFi access points, and/or other devices, based on several factors. These factors may include one or more factors that are based on network conditions (e.g., radio congestion, gateway congestion, etc.), applications invoked by the user device (e.g., a voice over Internet Protocol ("VoIP") application, a data application, a voice call, etc.), device capabilities (e.g., which technology, or technologies, the user device is capable of using), subscriber information associated with the user device, etc.

Figure 1A:
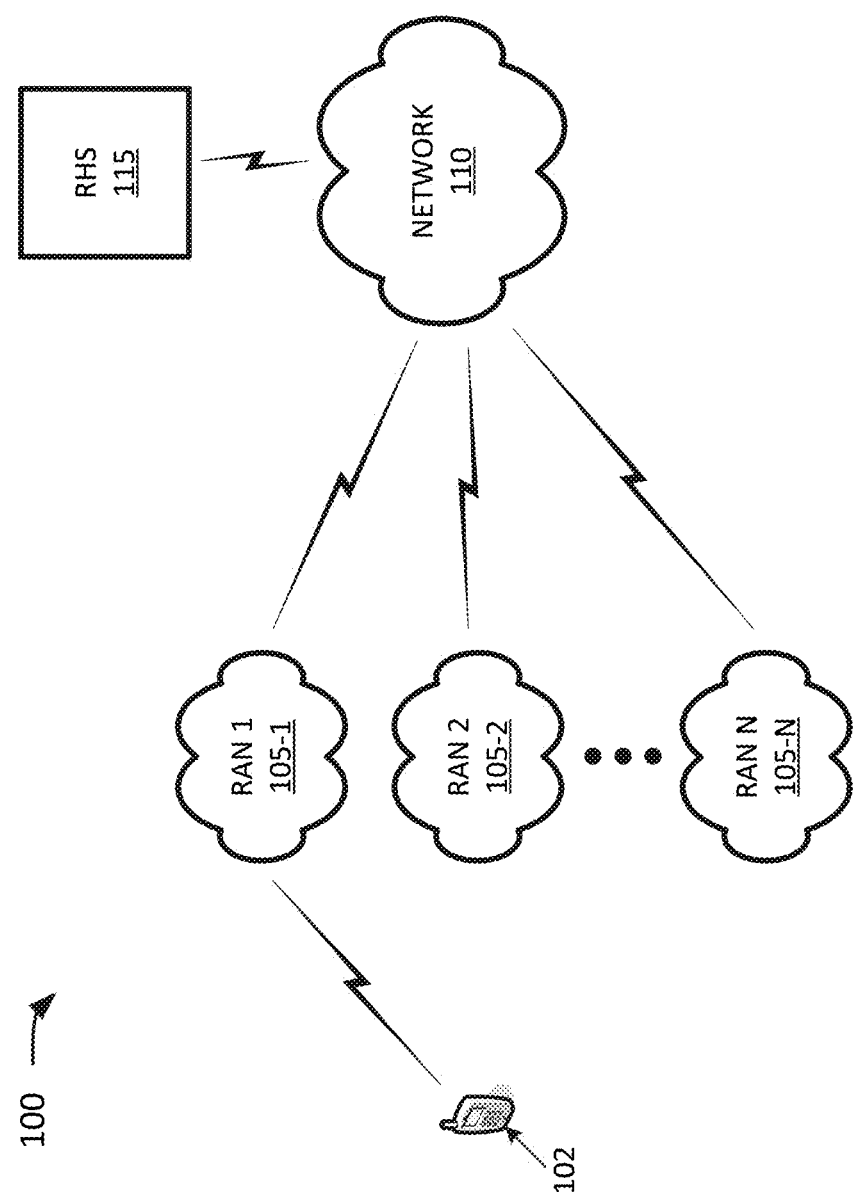
FIGS. 1A-C illustrate an overview of an example implementation described herein.
Figure 1B:
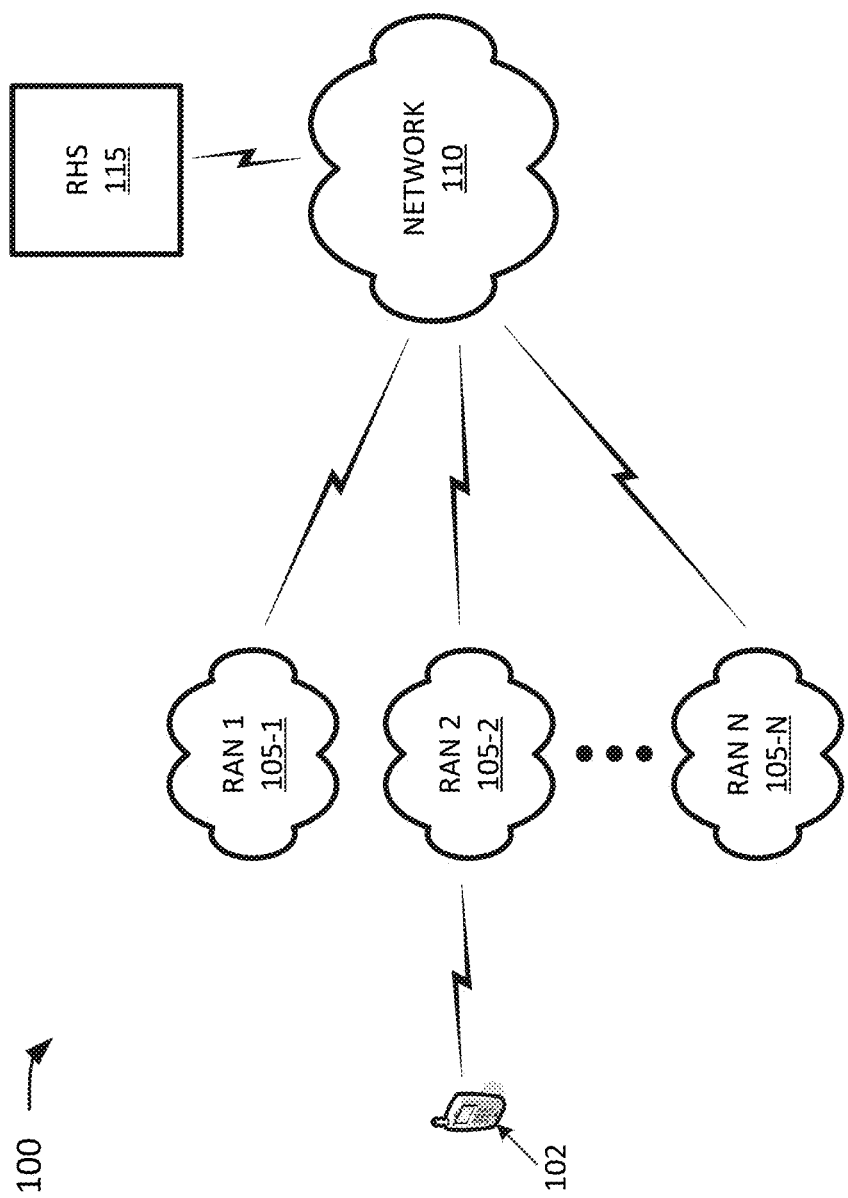
Figure 1C:
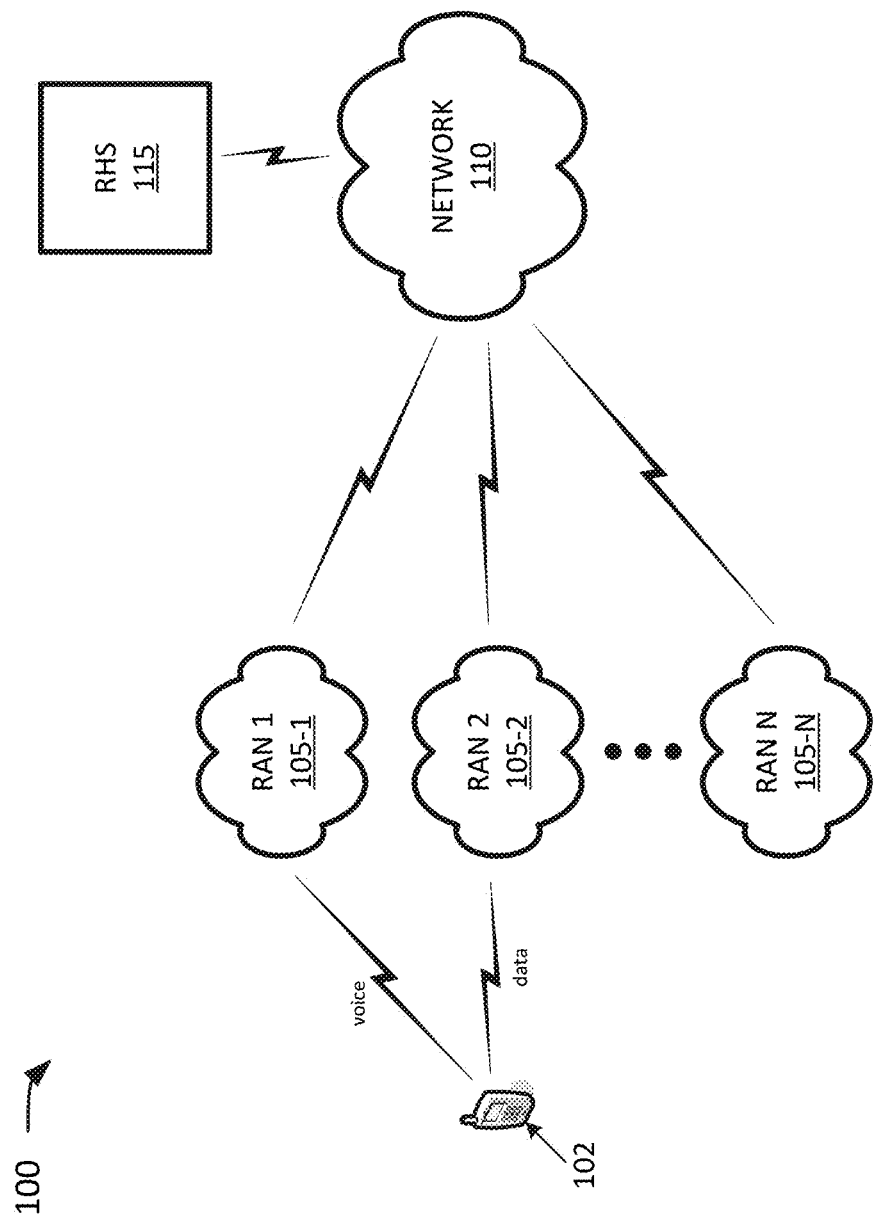

FIGS. 1A-C illustrate an example implementation described herein. As shown in FIGS. 1A-C, system 100 may include a user device 102, RANs 105-1 through 105-N (hereinafter referred to individually as "RAN 105," and collectively as "RANs 105"), network 110, and RAN handover server ("RHS") 115.

User device 102 may include any type of user device, such as a cellular telephone, a PDA, a tablet computer, a laptop computer, or the like. User device 102 may include multiple radio transceivers, that are each capable of communicating over one or more wireless access technologies. For instance, user device 102 may be capable of communicating via two or more of Long Term Evolution ("LTE"), CDMA2000 1× ("1×"), CDMA2000 Evolution-Data Optimized ("EV-DO"), IEEE 802.11x ("wi-fi"), or other types of technologies.

RANs 105 may include one or more devices that may enable a user device (e.g., user device 102) to wirelessly connect to one or more networks (e.g., to network 110), via RANs 105. For example, each of RANs 105 may include one or more wireless transceivers, which communicate with (e.g., transmit data to and/or from) user device 102. Each of RANs 105 may also communicate with (e.g., transmit data to and/or from) network 110. Furthermore, each of RANs 105 may communicate with RHS 115 (e.g. through network 110, and/or through another connection (not pictured)).

Network 110 may include one or more devices that transmit/receive voice and/or data to a circuit-switched, packet-switched network, and/or IP based network (e.g. LTE, IMS etc). In one embodiment, network 110 may include, for example, a Mobility Management Entity (MME), a Serving Gateway (SGW), a Packet Data Network Gateway (PDN-GW or PGW), a Call Session Control Function (CSCF), a Policy Charging and Rules Function (PCRF), a Media Resource Function (MRF), an Home Subscriber Server (HSS), a Mobile Switching Center ("MSC"), a Gateway MSC ("GMSC"), a Media Gateway ("MGW"), a Serving General Packet Radio Service ("GPRS") Support Node ("SGSN"), a Gateway GPRS Support Node ("GGSN"), and/or other devices. Network 110 may be a private network, and/or a public network, such as the Internet.

RHS 115 may include one or more devices that analyze information regarding user devices (e.g., user device 102) and/or network conditions in RANs 105. RHS 115 may be directly connected to one or more devices in any of RANs 105, may be included in one or more devices in any of RANs 105, and/or may be connected to any of RANs 105 through network 110. RHS 115 may use the analyzed information to instruct user device 102 and/or one or more RANs 105 to hand over a connection between user device 102 and one RAN 105 to another RAN 105. Examples of the types of information, that RHS 115 may receive, store, and/or analyze, are provided in further detail below.

As shown in FIG. 1A, assume that user device 102 is connected to network 110 via RAN 105-1. In other words, user device 102 may connect to RAN 105-1, in order to communicate with network 110. RHS 115 may determine, based on one or more factors, that user device 102 should connect to RAN 105-2 instead of RAN 105-1. Upon making this determination, RHS 115 may send an instruction or instructions (e.g., to user device 102, to RAN 105-1, and/or to RAN 105-2) that indicates that user device 102 should connect to RAN 105-2 instead of RAN 105-1.

As shown in FIG. 1B, user device 102 may now be connected to RAN 105-2, in response to the instruction(s) sent by RHS 115. As further shown in FIG. 1B, user device 102 may no longer be connected to RAN 105-1, once user device 102 connects to RAN 105-2.

As shown in FIG. 1C, user device 102 may simultaneously be connected to (e.g., simultaneously communicate with) multiple RANs, such as RANs 105-1 and 105-2. For example, RHS 115 may send an instruction that causes user device 102 to connect to both RANs 105-1 and 105-2. User device 102 may send/receive one type of traffic via RAN 105-1 (e.g., voice traffic), while sending/receiving a different type of traffic (e.g., data traffic) via RAN 105-2.

Thus, user device 102 may connect to various RANs 105 according to various factors, such as network congestion, capabilities of user device 102, subscriptions associated with user device 102, preferences of a network administrator, etc.

Figure 2:
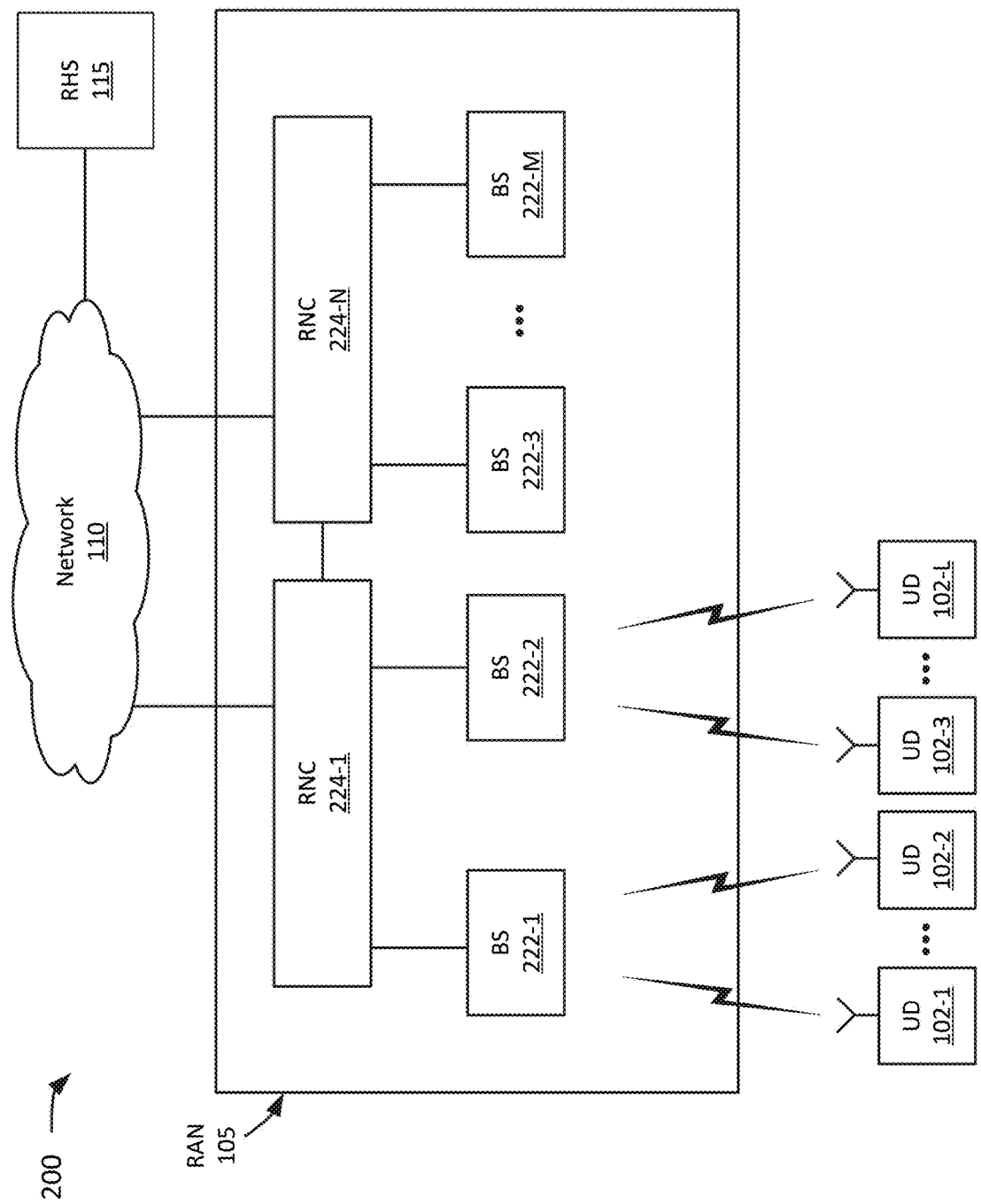
FIG. 2 is a diagram of an example network in which systems and/or methods, described herein, may be implemented.

FIG. 2 depicts a diagram of an example network 200 in which systems and/or methods described herein may be implemented. As shown, network 200 may include a group of user devices 102-1 through 102-L (where L is an integer that is greater than or equal to 1) (referred to collectively as "user devices 102," and in some instances individually, as "user device 102"), RAN 105, network 110, and RHS 115. Four user devices 102, a single RAN 105, and a single network 110 have been illustrated in FIG. 2 for simplicity. In practice, additional user devices 102, RANs 105, and/or networks 110 may be used. Also, in some instances, a component in network 200 (e.g., one or more of user device 102, RAN 105, and network 110) may perform one or more functions described as being performed by another component or group of components in network 200.

User device 102 may include one or more devices capable of sending/receiving voice and/or data to/from RAN 105. User device 102 may include, for example, a radiotelephone, a personal communications system ("PCS") terminal (e.g., a terminal that may combine a cellular radiotelephone with data processing and data communications capabilities), a PDA (e.g., a device that may include a radiotelephone, a pager, Internet/intranet access, etc.), a laptop computer, a tablet computer, etc.

RAN 105 may include one or more devices for transmitting voice and/or data to user device 102 and network 110. As illustrated in FIG. 2, RAN 105 may include a group of base stations 222-1 through 222-M (where M is an integer that is greater than or equal to 1) (referred to collectively as "base stations 222" and in some instances, individually as "base station 222"), and a group of radio network controllers ("RNCs") 224-1 through 224-N (where N is an integer that is greater than or equal to 1) (referred to collectively as "radio network controllers 224" and in some instances, individually as "radio network controller 224"). Four base stations 222 and two RNCs 224 are shown in FIG. 2 for simplicity. In practice, there may be additional or fewer base stations 222 and/or RNCs 224. Also, in some instances, a component in RAN 105 (e.g., one or more of base stations 222 and RNCs 224) may perform one or more functions described as being performed by another component or group of components in RAN 105.

RAN 105 may correspond to one or more particular technologies. For example, RAN 105 may correspond to an LTE technology. In such an example, base stations 222 may take the form of evolved node Bs ("eNBs"), and RNCs 224 may take the form of mobile management entities ("MMEs") and Serving Gateways (SGWs).

Base stations 222 may include one or more network devices that receive voice and/or data from RNCs 224 and transmit the voice and/or data to/from user devices 102 via an air interface (e.g., via one or more wireless transceivers associated with base stations 222). Base stations 222 may also include one or more network devices that receive voice and/or data from user devices 102 over an air interface and transmit that voice and/or data to RNCs 224 or other user devices 102.

RNCs 224 may include one or more devices that control and manage base stations 222. Radio network controllers 224 may also include devices that perform data processing to manage utilization of radio network services. RNCs 224 may transmit/receive voice and data to/from base stations 222, other radio network controllers 224, and/or network 110.

RNC 224 may act as a controlling radio network controller ("CRNC"), a drift radio network controller ("DRNC"), and/or a serving radio network controller ("SRNC"). A CRNC may be responsible for controlling the resources of a base station 222. A SRNC may serve particular user device 102 and may manage connections towards that user device 102. A DRNC may fulfill a similar role to the SRNC (e.g., may route traffic between a SRNC and user device 102).

Network 110 may include one or more devices that transmit/receive voice and/or data to a circuit-switched and/or packet-switched network. In one embodiment, network 110 may include, for example, a CSCF, a PCRF, a MRF, an HSS, a MSC, a GMSC, a MGW, a SGSN, a GGSN, and/or other devices.

As described above, RHS 115 may include one or more devices that analyze information regarding user devices (e.g., user device 102) and/or network conditions in RANs 105. RHS 115 may use the analyzed information to cause the handover of a connection between user device 102 and one RAN 105 to another RAN 105.

Figure 3:
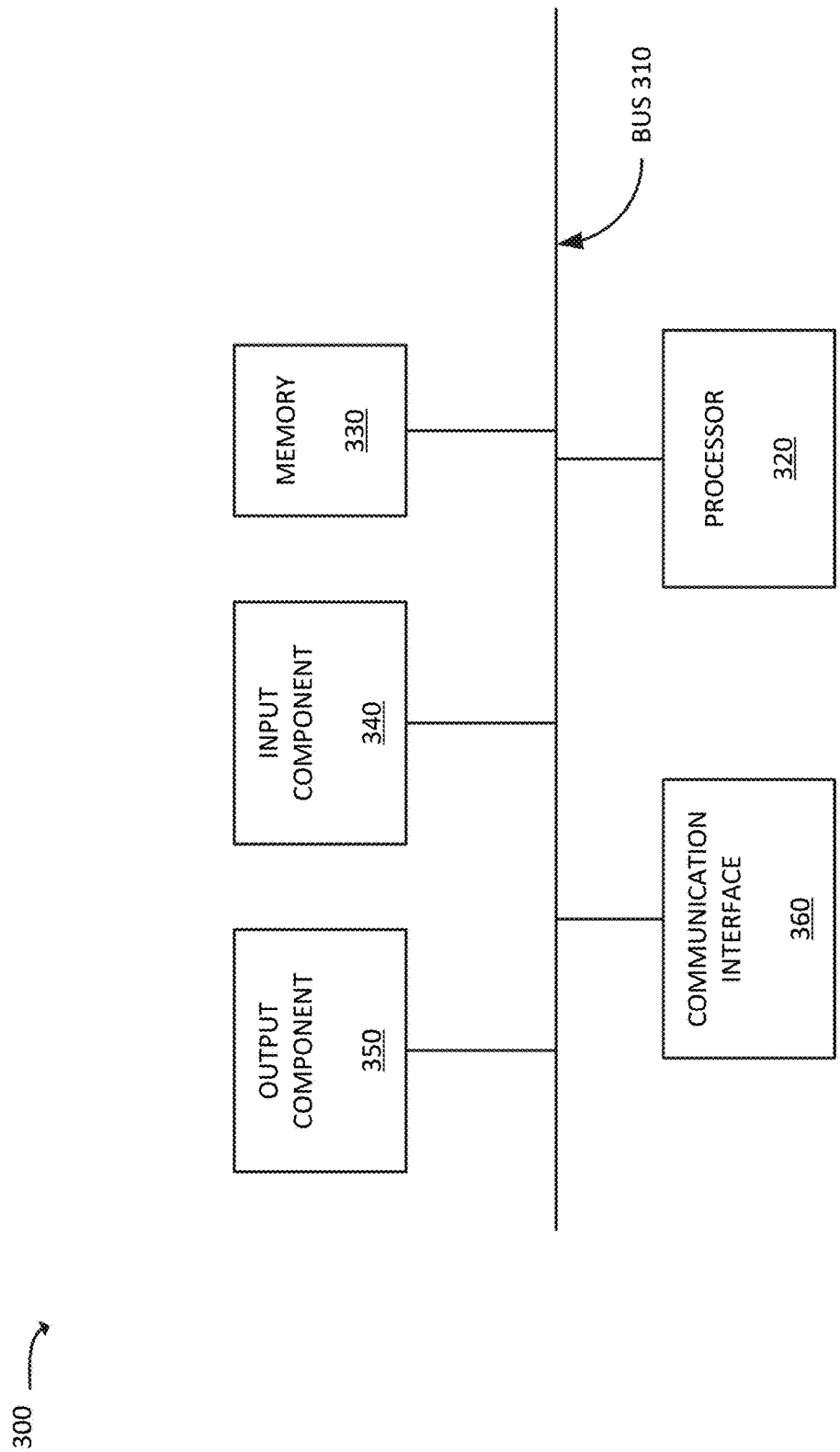
FIG. 3 is a diagram of example components of one or more devices shown in FIG. 2.

FIG. 3 is a diagram of example components of device 300. Each of the devices illustrated in FIG. 1 or 2 may include one or more devices 300. Device 300 may include bus 310, processor 320, memory 330, input component 340, output component 350, and communication interface 360. In another implementation, device 300 may include additional, fewer, different, or differently arranged components. Some non-limiting examples of device 300, with additional and/or different components, are discussed below.

Bus 310 may include one or more communication paths that permit communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes ("LEDs"), etc.

Communication interface 360 may include any transceiver-like mechanism that enables device 300 to communicate with other devices and/or systems. For example, communication interface 360 may include an Ethernet interface, an optical interface, a coaxial interface, or the like. Communication interface 360 may include a wireless communication device, such as an infrared (IR) receiver, a Bluetooth radio, or the like. The wireless communication device may be coupled to an external device, such as a remote control, a wireless keyboard, a mobile telephone, etc. In some embodiments, device 300 may include more than one communication interface 360. For instance, device 300 may include an optical interface and an Ethernet interface.

As will be described in detail below, device 300 may perform certain operations relating to handing over connections between user devices 102 and RANs 105. Device 300 may perform these operations in response to processor 320 executing software instructions stored in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions stored in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
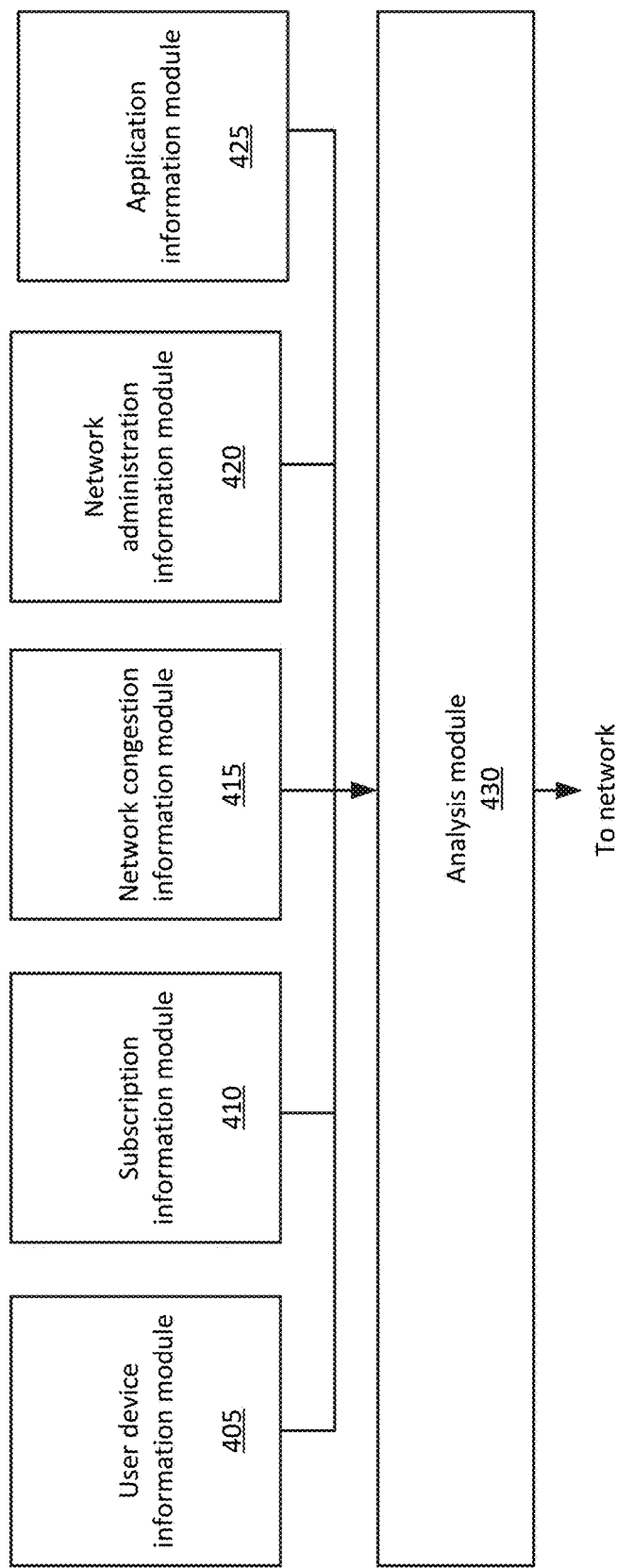
FIG. 4 is a diagram of example components of a RAN Handover Server ("RHS") shown in FIGS. 1A-C.

FIG. 4 is a diagram of example functional components of RHS 115. As shown in FIG. 4, RHS may include user device information module 405, subscription information module 410, network congestion information module 415, network administration information module 420, application information module 425, and analysis module 430. Any, or all, of modules 405-430 may be implemented by or more memory devices (such as memory 330) and/or one or more processors (such as processor 320). Furthermore, multiple modules may be associated with the same memory device and/or processor (e.g., one memory device, or one set of memory devices, may store information associated with at least two different ones of modules 405-425).

Module 405 may receive and/or store user device information. This information may identify capabilities of one or more user devices (e.g., user device 102). Such information may indicate, for example, via which technology, or technologies, user device 102 is capable of communicating. For example, the information may indicate that user device 102 is capable of communicating via LTE and wi-fi technologies. The information stored by module 405 may also identify a geographic location of user device 102. Module 405 may receive this information from user device 102, and/or from one or more other devices that generate, receive, and/or store information regarding user device 102 (e.g., a Policy Charging and Rules Function ("PCRF"), a Home Subscriber Server ("HSS"), BS 222, etc.).

Module 410 may receive and/or store subscription information associated with user device 102. The subscription information may indicate one or more technologies that user device 102 is subscribed to, and/or one or more technologies that user device 102 is not permitted to use. For example, the information may indicate that user device 102 is subscribed to a service, whereby user device 102 always uses LTE technology when user device 102 is in range of a RAN 105 that employs LTE technology. Additionally, or alternatively, the information may indicate that user device 102 may never use wi-fi technology Additionally, or alternatively, the information may indicate that user device 102 never uses wi-fi technology if user device 102 is in range of any RANs 105, that are associated with any other technology.

The subscription information, associated with user device 102, may, additionally, or alternatively, indicate a priority of technologies associated with RANs 105, in a ranked order. For example, the stored subscription information may indicate that user device 102 should use LTE technology when user device 102 is in range of a RAN 105 that employs LTE, and one or more other RANs 105 that employ another type of technology (e.g., wi-fi). Stored subscription information for another user device may indicate a different priority for the other user device. For instance, the stored subscription information may indicate that the other user device will prefer using wi-fi technology when the other user device is in range of a RAN 105 that employs wi-fi and one or more other RANs 105 that employ another type of technology (e.g., LTE).

Module 410 may receive subscription information from user device 102, and/or from one or more other devices that generate, receive, and/or store subscription information associated with user device 102 (e.g., a PCRF, an HSS, an Authentication-Authorization-Accounting ("AAA") server, etc.).

Module 415 may receive and/or store information regarding network congestion. For example, the information regarding network congestion may identify an amount of radio traffic associated with a particular RAN 105, an amount of traffic being handled by one or more servers or other network devices of RAN 105, or the like. Module 410 may receive this information from one or more devices, of RAN 105, that collect and/or identify traffic/congestion within RAN 105 (e.g., BS 222, RNC 224, etc.).

Module 420 may receive and/or store network administration information that identifies network device capabilities, network parameters, or the like. Such information may include information identifying with which technology, or technologies, each RAN 105 is associated, information identifying a particular RAN 105 to which user device 102 is connected, information identifying a location of one or more RANs 105, information identifying a coverage area of one or more RANs 105, etc.

Additionally, or alternatively, module 420 may receive and/or store a system-wide priority list that identifies technologies associated with RANs 105, in a ranked order. This system-wide priority list may be independent of a priority list that is identified by subscriber information for individual user devices 102. For example, the system-wide priority list may rank a first technology (e.g., wi-fi) higher than another a second technology (e.g., LTE), while a different priority list, associated with user device 102, may indicate a different priority.

Module 420 may receive the network administration information from one or more devices of RAN 105 (e.g., BS 222, RNC 224, etc.). Additionally, or alternatively, the information may be received by module 420 from a user (e.g., an administrator that owns and/or operates one or more of RANs 105, network 110, and/or RHS 115).

Module 425 may receive and/or store information regarding one or more applications that are invoked by a user device (e.g., user device 102), while user device is connected to a particular RAN 105. For example, module 425 may receive an indication that user device 102 has invoked a voice call application, a VoIP application, a video streaming application, video telephoning, interactive gaming, etc. Module 425 may receive the indication from user device 102, and/or from one or more devices of RAN 105 (e.g., BS 222, RNC 224, etc.).

Module 430 may receive information from one or more of modules 405-425, analyze the received information, and determine, based on the analysis, whether a connection between user device 102 and a particular RAN 105 should be handed over to another RAN 105. Examples of the analysis performed by module 430 are described further below with respect to FIGS. 5-8. Upon determining that the connection should be handed over, module 430 may send a message to user device 102, RAN 105 (to which user device 102 is currently connected), and/or another RAN 105 (to which the connection should be handed over).

Although FIG. 4 shows example modules of RHS 115, in other implementations, RHS 115 may include fewer, different, or additional modules than depicted in FIG. 4. In still other implementations, one or more modules of RHS 115 may perform the tasks performed by one or more other modules of RHS 115.

Figure 5:
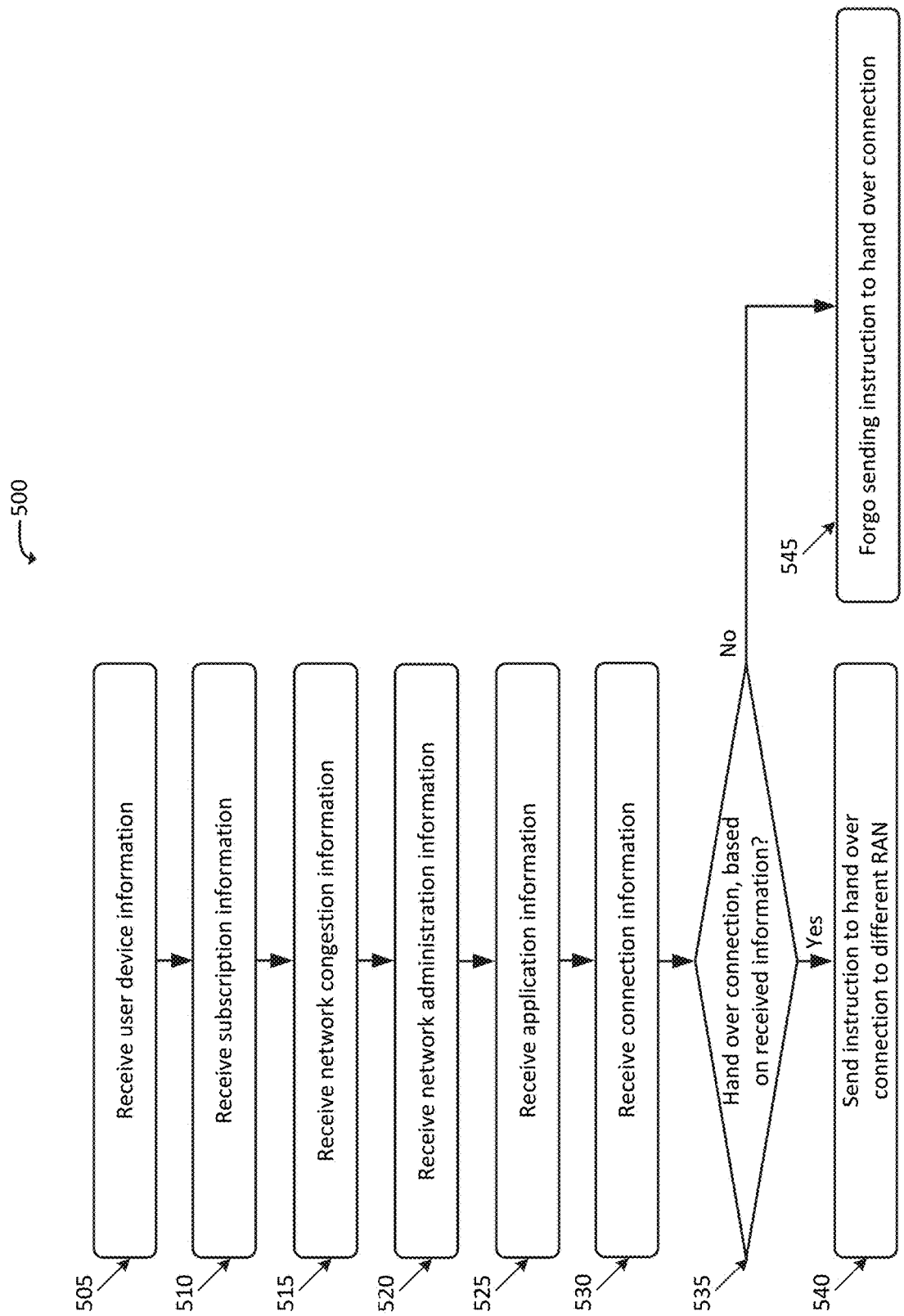
FIG. 5 is a diagram of an example process for handing over a connection based on received information regarding a user device, a network, network congestion, and/or an invoked application.

FIG. 5 shows an example process 500 for handing over a connection, between user device 102 and one RAN 105, to another RAN 105. In one example implementation, process 500 may be performed by RHS 115. Specifically, for example, process 500 may be performed by one or more modules 405-430 described above with respect to FIG. 4. In another example implementation, some or all of process 500 may be performed by a device or collection of devices separate from, or in combination with, RHS 115.

Process 500 may include receiving user device information (block 505). For example, RHS 115 (e.g., module 405) may receive user device information regarding user device 102. As described above, user device information may indicate, for example, via which technology, or technologies, user device 102 is capable of communicating, a geographic location of user device 102, etc.

Process 500 may also include receiving subscription information (block 510). For example, RHS 115 (e.g., module 410) may receive subscription information associated with user device 102. As described above, subscription information may indicate one or more technologies that user device 102 is subscribed to, and/or one or more technologies that user device 102 is not permitted to use. The subscription information may, additionally, or alternatively, indicate a priority of technologies associated with RANs 105, in a ranked order.

Process 500 may further include receiving network congestion information (block 515). For example, RHS 115 (e.g., module 415) may receive network congestion information regarding one or more RANs 105. As described above, network congestion information may identify an amount of radio traffic associated with a particular RAN 105, an amount of traffic being handled by one or more servers of RAN 105, or the like.

Process 500 may additionally include receiving network administration information (block 520). For example, RHS 115 (e.g., module 420) may receive network administration information regarding one or more RANs 105. As described above, network administration information may include, information identifying with which technology, or technologies, each RAN 105 is associated, information identifying a particular RAN 105 to which user device 102 is connected, information identifying a location of one or more RANs 105, information identifying a coverage area of one or more RANs 105, a system-wide priority list that identifies technologies associated with RANs 105, in a ranked order, etc.

Process 500 may also include receiving application information (block 525). For example, RHS 115 (e.g., module 425) may receive information identifying one or more applications that have been invoked by user device 102. For example, the application information may identify that user device 102 has invoked a voice call application, a VoIP application, a video streaming application, etc.

Process 500 may further include receiving connection information (block 530). For example, RHS 115 (e.g., module 425) may receive information identifying whether one or more connections, associated with user device 102, are active and/or idle. For example, an active connection may be associated with an ongoing video conference, while an idle connection may be associated with a data connection over which data is not presently being transmitted to and/or from user device 102.

Process 500 may further include determining whether to hand over a connection, based on the received information (block 535). For example, RHS 115 (e.g., module 430) may determine, based on some, or all, of the information received at blocks 505-525, whether to hand over a connection, between user device 102 and a particular RAN 105, to another RAN 105. For instance, RHS 115 may calculate one or more values based on some, or all, of the information received at blocks 505-525. RHS 115 may combine the calculated values in order to determine whether to hand over the connection.

For example, assume that user device information, associated with user device 102, indicates that user device 102 is capable of communicating via LTE and wi-fi technologies. Further assume that the received network administration information indicates that user device 102 is connected to RAN 105-1 via LTE technology. Further still, assume that RHS 115 determines, based on user device information and network administration information, that user device 102 is in range of RAN 105-2, which is associated with wi-fi technology. Additionally, assume that RHS 115 determines, based on network congestion information, that RAN 105-1 is congested, and/or that RAN 105-1 is more congested than RAN 105-2. RHS 115 may determine, based on the received user device information, network administration information, and network congestion information, that the connection, between user device 102 and RAN 105-1, should be handed over to RAN 105-2.

Further to the above example, assume that RHS 115 receives subscription information, identifying that user device 102 is associated with a subscription that indicates that LTE technology should be used whenever LTE technology is available, regardless of other factors (e.g., whether another technology is available, network congestion, invoked applications, etc.). In such a situation, RHS 115 may determine that the connection, between user device 102 and RAN 105-1, should not be handed over to RAN 105-2, even though RHS 115 has identified that RAN 105-1 is congested.

As another example, assume that RHS 115 receives information identifying that a particular connection between user device 102 and RAN 105-1 is idle. RHS 115 may determine that the connection should be handed over to a RAN that is associated with lower performance (e.g., lower bandwidth, higher latency, etc.) than RAN 105-1. On the other hand, assume that RHS 115 receives information identifying that a particular connection between user device 102 and RAN 105-1 is active. RHS 115 may determine that the connection should be handed over to a less-congested RAN 105, and/or a RAN 105 that is associated with higher performance (e.g., higher bandwidth, lower latency, etc.) than RAN 105-1.

While the preceding example was explained in the context of specific user device information, subscription information, network congestion information, and network administration information, any combination of any type of information (e.g., any combination of user device information, subscription information, network congestion information, network administration information, and/or application information) may be used to determine whether to hand over a connection, between user device 102 and a particular RAN 105, to another RAN 105.

In some implementations, certain types of information may be weighted differently from other types of information. For example, RHS 115 may identify, based on network congestion information, that RAN 105 (which may be associated with LTE technology) is congested (and/or may identify a level of congestion), and may generate a value (e.g., 1, 75, 100, etc.) based on this information. RHS 115 may assign a weight to the value (e.g., 0.3, 0.5, 1.0, etc.). Further, in this example, RHS 115 may identify that user device 102 is associated with a subscription, that guarantees the use of a particular technology (e.g., LTE) when the particular technology is available. RHS 115 may identify that user device 102 is associated with a subscription that a technology that is provided by RAN 105, and may generate a value (e.g., 1, 100, etc.) based on this identification. RHS 115 may also assign a weight to this value (e.g., 0.2, 0.5, etc.). Based on the generated values and their weights, RHS 115 may take into account several factors, and the respective importance of each factor, when determining whether to hand over a connection between user device 102 and RAN 105. The weights may be provided by a user (e.g., an administrator of RHS 115, RAN 105, etc.), or may be automatically generated based on the types of applications that are invoked by user device 102, subscriptions associated with user device 102, and/or congestion level of RAN 105.

Additionally, or alternatively, certain types of information may override other types of information. For instance, RHS 115 may store information identifying that VoIP applications should be handled by RANs 105 that are associated with LTE technology, and not by RANs 105 that are not associated with LTE technology (e.g., RANs that are associated with wi-fi technology and not with LTE technology). RHS 115 may identify, for example, that user device 102 has invoked a VoIP application. In such an example, RHS 115 may hand over a connection involving user device 102 to a particular RAN 105 that is associated with LTE technology (or may forgo handing over the connection, if user device is already connected to a particular RAN 105 that is associated with LTE technology), regardless of other factors (e.g., regardless of congestion information, information that ranks technologies, etc.).

Further and/or more detailed examples of how RHS 115 may determine whether to hand over a connection, between user device 102 and a particular RAN 105, to another RAN 105 (at block 530), are provided below with respect to FIGS. 6-8.

If RHS 115 determines that the connection should be handed over (block 535—YES), RHS 115 may send an instruction to hand over the connection to a different RAN 105 (block 540). For example, RHS 115 may send an instruction and/or notification to user device 102, RAN 105 to which user device 102 is connected, and/or RAN 105 to which the connection is being handed over.

When sending multiple instructions to hand over multiple different connections (at block 540) within a particular time period, RHS 115 may stagger the sending of the multiple instructions, in order to avoid a condition where numerous connections may be handed over to the same RAN 105 within a brief period of time. For example, RHS 115 may identify whether a particular threshold quantity of instructions to hand over connections have been sent within a particular period of time. If the threshold quantity of handover instructions has been sent within the particular period of time, RHS 115 may delay sending another handover instruction until the quantity of sent handover instructions falls below the threshold quantity.

For example, assume that the threshold quantity is 100 instructions per minute. Further assume that RHS 115 has sent one instruction at time T, another instruction at time T+2 seconds, and another 98 instructions between times T and T+59 seconds. Because the threshold quantity in this example is 100 instructions per minute, RHS 115 may not send a 101st instruction until time T+60 seconds, and may not send a 102nd instruction until time T+62 seconds.

Furthermore, the instruction to hand over the connection to a different RAN 105 (sent at block 540) may correspond to an instruction to connect to the different RAN 105, while retaining the connection with the previous RAN 105. For example, the instruction may include an instruction to communicate voice traffic via a different RAN 105, while retaining the connection with the previous RAN 105 for data traffic.

If, on the other hand, RHS 115 determines that the connection should not be handed over (block 535—NO), RHS 115 may forgo sending an instruction to hand over the connection to a different RAN 105 (block 545). When foregoing to send the instruction to hand over the connection, RHS 115 may forgo sending any communication regarding the determination, made at block 535, to user device 102 or any RAN 105. Alternatively, RHS 115 may notify user device 102 and/or one or more RANs 105 that RHS 115 has determined that the connection between user device 102 and RAN 105 should not be handed over.

Although process 500 was described as including blocks 505-545, different, additional, or fewer blocks may be used. For example, in some implementations, process 500 may not include one or more of blocks 505-530. In on example, assume that process 500 does not include block 525. In such an example, block 535 may not include determining whether to hand over a connection based on application information. Additionally, or alternatively, not all of the information received at one or more of blocks 505-530 may be used when making the determination at block 535. Furthermore, additional information, which may not have been specifically described with respect to blocks 505-530, may be used when making the determination at block 535.

Figure 6:
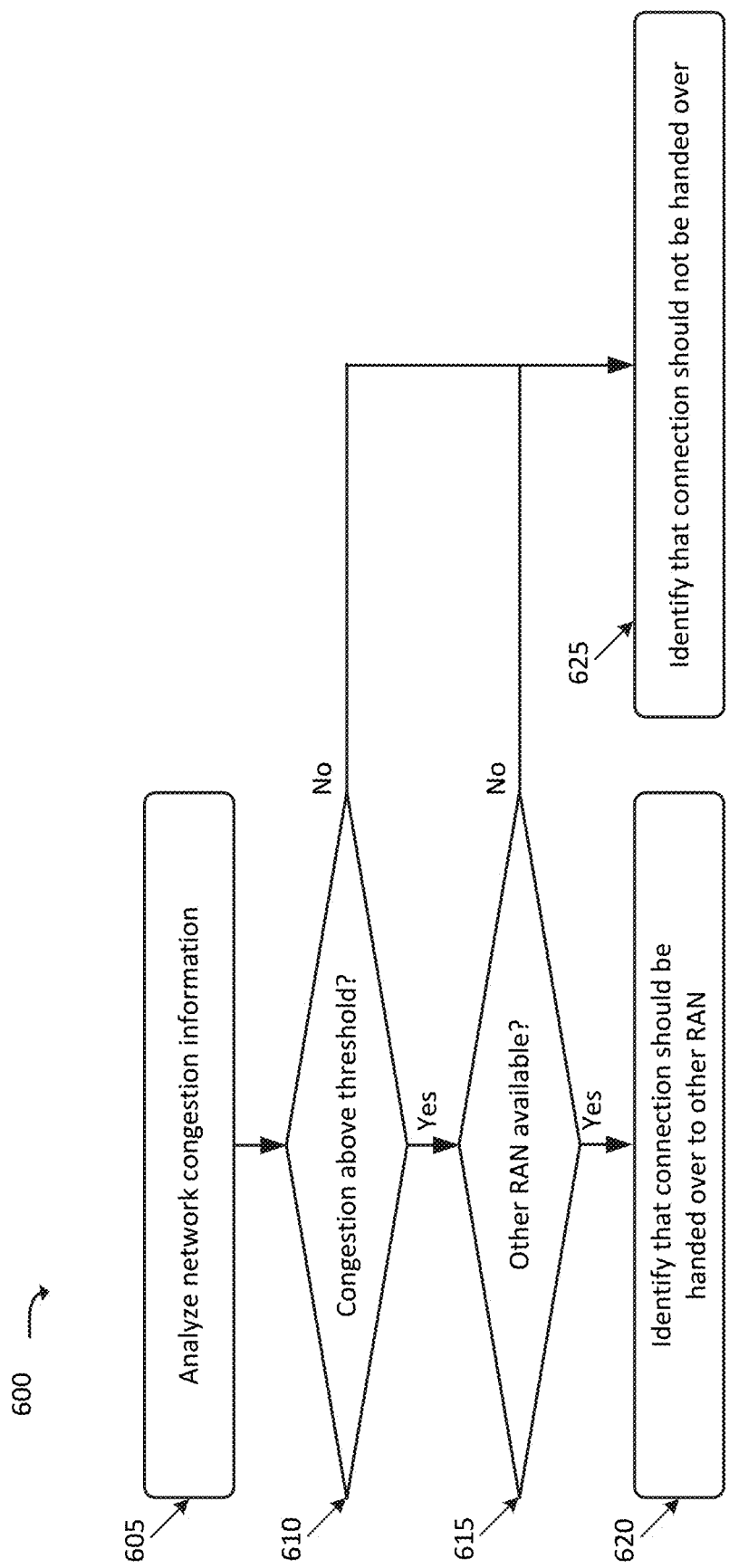
FIG. 6 is a diagram of an example process for handing over a connection based on network congestion.
Figure 7:
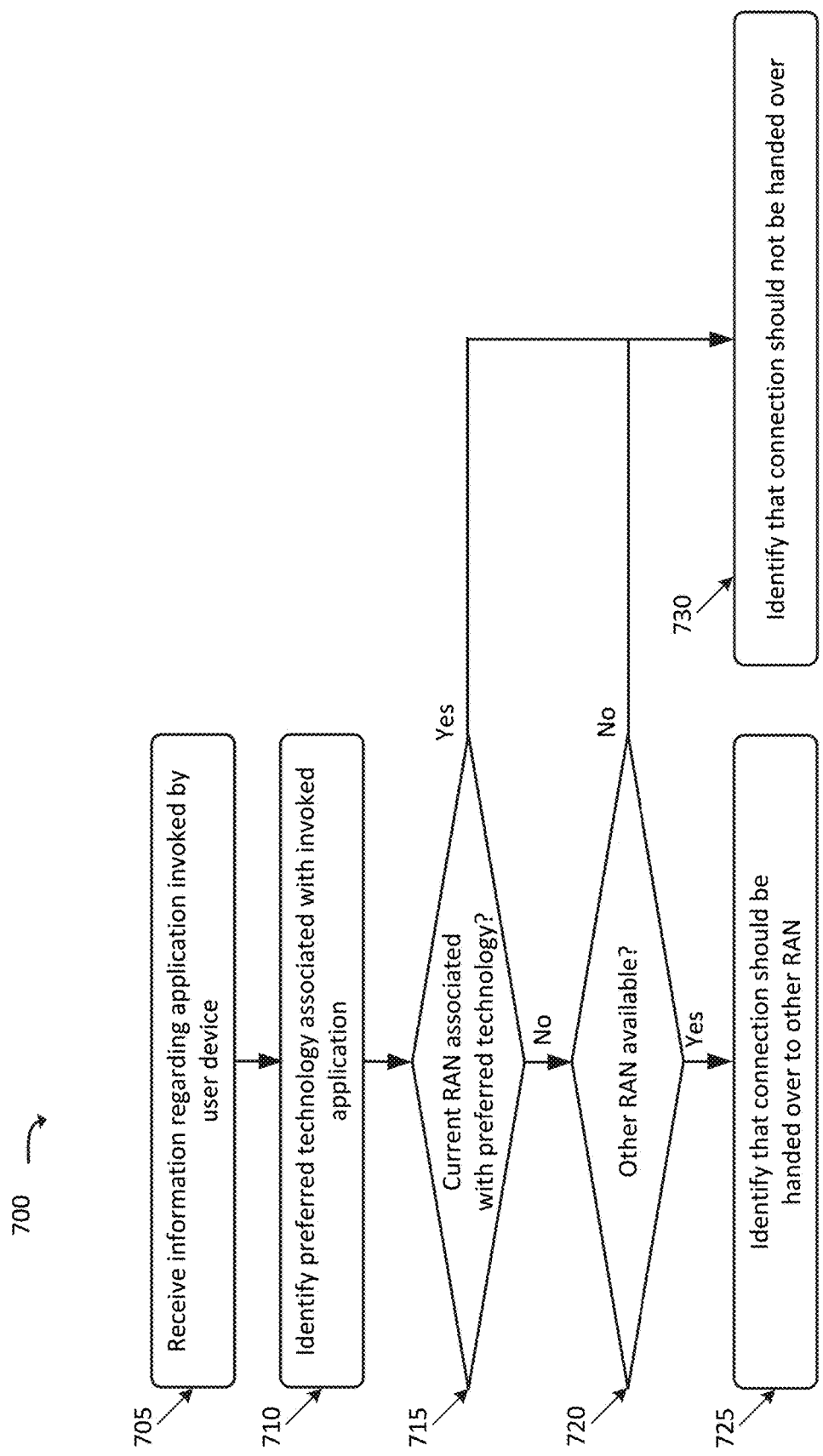
FIG. 7 is a diagram of an example process for handing over a connection based on identifying a technology via which a user device is presently connected to a RAN.
Figure 8:
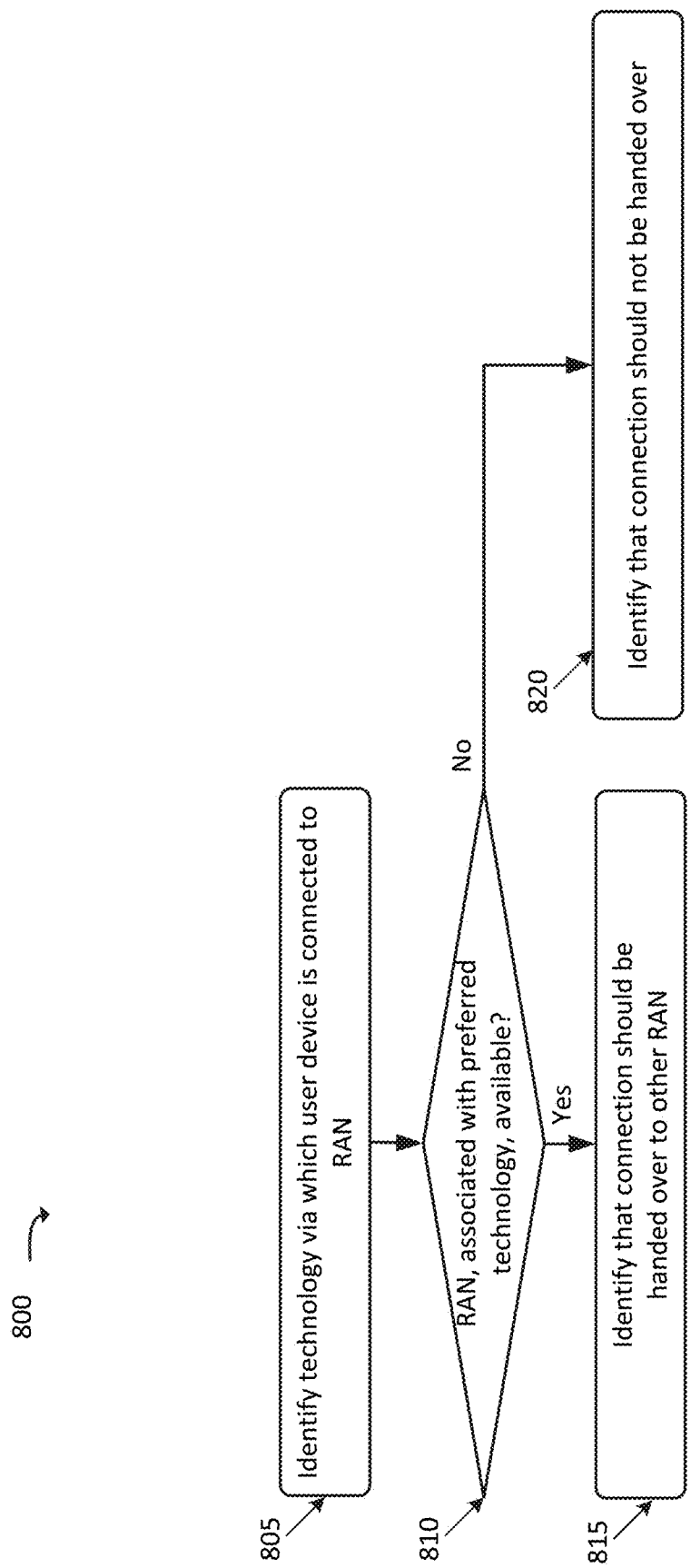
FIG. 8 is a diagram of an example process for handing over a connection based on an invoked application.

FIGS. 6-8 illustrate example processes 600, 700, and 800, respectively, of how RHS 115 may determine (at block 530) whether to hand over a connection between user device 102 and RAN 105. As discussed above with respect to FIG. 5, any combination of processes 600, 700, and 800 may be used. Furthermore, additional, different, or fewer processes may be used when determining (at block 530) whether to hand over a connection between user device 102 and RAN 105.

FIG. 6 illustrates an example process 600 for identifying whether a connection should be handed over, based on network congestion information. In one example implementation, process 600 may be performed by RHS 115. Specifically, for example, process 600 may be performed by module 430, described above with respect to FIG. 4. In another example implementation, some or all of process 600 may be performed by a device or collection of devices separate from, or in combination with, module 430 and/or RHS 115.

Process 600 may include analyzing network congestion information (block 605). For example, RHS 115 may identify an amount of traffic, or congestion, associated with one or more RANs 105 (including, for instance, a particular RAN 105 to which user device 102 is connected). The identified amount of traffic, or congestion, may correspond to radio traffic associated with the one or more RANs 105 (e.g., an amount of radio bandwidth being consumed and/or utilized by one or more radio transceivers associated with the one or more RANs 105). Additionally, or alternatively, the identified amount of traffic, or congestion, may include a correspond to a quantity of connections associated with the one or more RANs 105 (e.g., a number of connections between each RAN 105 and one or more user devices 102).

Process 600 may further include determining whether the congestion information is above a threshold (block 610). For example, RHS 115 may identify whether an amount of traffic, or congestion, associated with a particular RAN 105, to which user device 102 is connected, is above a threshold. The threshold may be provided by a user (e.g., an administrator associated with RHS 115, and/or associated with one or more RANs 105). Additionally, or alternatively, the threshold may be automatically generated.

If the congestion information is above the threshold (block 610—YES), process 600 may include determining whether another RAN 105 is available (block 615). For example, RHS 115 may identify whether user device 102 is in range of another RAN 105, in addition to the RAN 105 to which user device 102 is presently connected. This determination may be based on user device information (e.g., a geographic location of user device 102) and/or network administration information (e.g., a geographic location of the other RAN, coverage area(s) of the other RAN, etc.). Additionally, or alternatively, this determination may be based on congestion and/or traffic associated with the other RAN 105. For example, if the other RAN 105 is congested (e.g., the congestion and/or traffic of the other RAN 105 is above a threshold), RHS 115 may determine that the other RAN 105 is not available. If, on the other hand, the other RAN 105 is not congested, RHS 115 may determine that the other RAN 105 is available.

If the other RAN 105 is available (block 615—YES), then RHS 115 may identify that the connection, between user device 102 and RAN 105 with which user device 102 is presently connected, should be handed over to the other RAN 105. If, on the other hand, the congestion is not above the threshold (block 610—NO), and/or another RAN 105 is not available (block 615—NO), process 600 may include identifying that the connection should not be handed over (block 625).

While process 600 was described in terms of blocks 605-625, different, additional, or fewer blocks may be used. For example, additionally, or in lieu of block 610, RHS 115 may compare the congestion of a particular RAN 105, to which user device 102 is presently connected, to the congestion of the other RAN 105, and determine, based on the comparison, whether the connection should be handed over to the other RAN 105. For example, if the congestion of the particular RAN 105, to which user device 102 is presently connected, is greater than the congestion of the other RAN 105, RHS 115 may determine that the connection should be handed over to the other RAN 105. Alternatively, RHS 115 may determine that the connection should be handed over to the other RAN 105 when the congestion of the particular RAN 105 is greater than the congestion of the other RAN 105, by at least a particular amount. For example, if the congestion of the particular RAN 105 is greater than the congestion of the other RAN 105, but not by at least the particular amount, RHS 115 may determine that the connection should not be handed over to the other RAN 105.

Furthermore, while blocks 620 and 625 are illustrated as "Identify that connection should be handed over to other RAN" and "Identify that connection should not be handed over," respectively, the network congestion information, analyzed in FIG. 6, may, in some implementations, merely serve as a factor that allows RHS 115 to determine whether to hand over a connection. For example, when RHS 115 determines that the congestion of RAN 105 is above a threshold (block 610—YES), and another RAN 105 is available (block 615—YES), RHS 115 may generate a value that indicates that RAN 105 is congested and that the other RAN 105 is available. However, as described above with respect to block 535 of FIG. 5, this value may be combined with one or more other values in order to ultimately determine whether to hand over the connection to the other RAN 105. Thus, it is possible that a scenario may exist where block 620 is performed, but RHS 115 ultimately foregoes sending an instruction to hand over the connection (block 540 of FIG. 5).

The above-described process may ease congestion of one or more RANs 105, that are associated with a particular technology, by allowing one or more other RANs 105, that are associated with another technology, via which user device 102 is capable of communicating, to handle connections with user device 102. Thus, traffic may be spread across multiple RANs 105, in order to provide any number of benefits, such as lower bandwidth consumption, to congested RANs 105.

FIG. 7 illustrates an example process 700 for identifying whether a connection should be handed over, based on an application that is invoked by a user device. In one example implementation, process 700 may be performed by RHS 115. Specifically, for example, process 700 may be performed by module 430, described above with respect to FIG. 4. In another example implementation, some or all of process 700 may be performed by a device or collection of devices separate from, or in combination with, module 430 and/or RHS 115.

Process 700 may include receiving information regarding an application that is invoked by a user device (block 705). For example, RHS 115 may receive an identification of an application, and/or a type of application, that has been invoked by user device 102. For example, RHS 115 may receive information that indicates that user device 102 has invoked a VoIP application, a voice call application, a video streaming application, etc. RHS 115 may receive the information regarding the invoked application from user device 102, and/or from one or more devices of RAN 105, to which user device 102 is connected.

Process 700 may also include identifying a preferred technology associated with the invoked application (block 710). For example, RHS 115 may store an identification of one or more preferred technologies that are associated with each of one or more applications and/or types of applications. The identification of the one or more preferred technologies may include a ranked list of two or more technologies. For instance, the identification may indicate that an LTE technology is more preferable than (e.g., is ranked higher than) a wi-fi technology when the invoked application is a VoIP application, while the identification may indicate that a wi-fi technology is more preferable than an LTE technology when the invoked application is a video streaming application. RHS 115 may compare the identified application, that has been invoked by user device 102, to the identification of one or more preferred technologies that are associated with the identified application, in order to identify the one or more preferred technologies that are associated with the identified application.

Process 700 may further include determining whether a current RAN 105, to which user device 102 is presently connected, is associated with one or more of the preferred technologies (block 715). For example, RHS 115 may determine whether the current RAN 105 is associated with a highest-ranked technology, in the ranked list of technologies. Additionally, or alternatively, RHS 115 may determine whether a technology associated with RAN 105 is a highly ranked technology, without necessarily being a highest-ranked technology in the ranked list of technologies. In order to do so, RHS 115 may determine whether a technology associated with RAN 105 is within the top X of technologies in the ranked list of technologies (where X is an integer is greater than or equal to 2). Additionally, or alternatively, RHS 115 may determine whether a technology associated with RAN 105 is within the top Y % of technologies in the ranked list of technologies (where Y is a number between 0 and 100). The quantities X and/or Y may be configured by a user (e.g., an administrator of RHS 115, and/or an administrator of one or more RANs 105). Additionally, or alternatively, the quantities X and/or Y may be generated and/or adjusted automatically.

RHS 115 may identify the current RAN 105 based on network administration information (e.g., information received at block 520 of FIG. 5), including a technology associated with RAN 105. RHS 115 may compare the preferred technology (identified at block 710) with the technology associated with RAN 105, to which user device 102 is presently connected, in order to determine whether the current RAN 105 is associated with the preferred technology.

If the current RAN 105 is not associated with the preferred technology (or with one or more of the preferred technologies, as described above) (block 715—NO), then process 700 may include determining whether another RAN 105 is available (block 720). For example, assume that the application, invoked by user device 102, is a VoIP application, while the current RAN 105 is not associated with an LTE technology (e.g., current RAN 105 may be associated with wi-fi or another technology). In such an example, RHS 115 may determine that the current RAN 105 is not associated with the preferred technology for VoIP applications (e.g., is not associated with an LTE technology).

When determining whether another RAN 105 is available (at block 720), RHS 115 may determine whether another RAN 105, which is in range of user device 102, is associated with the preferred technology (or one or more of the identified preferred technologies). Additionally, or alternatively, RHS 115 may identify whether another RAN 105 is associated with a more preferred technology (e.g., a technology that is ranked higher on the ranked list, a technology that is ranked within the top X or the top Y % of technologies, etc.) than a technology associated with the current RAN 105.

If another RAN 105, which is associated with a preferred (or a more preferred) technology, for the invoked application, is available (e.g., is in range of user device 102) (block 720), then RHS 115 may identify that the connection, between user device 102 and current RAN 105, with which user device 102 is presently connected, should be handed over to the other RAN 105. If, on the other hand, the current RAN 105 is associated with a preferred technology (e.g., a highest-ranked technology) (block 715—YES), and/or if another RAN 105 (e.g., a RAN 105 that is associated with a more preferred technology than a technology associated with the current RAN 105) is not available (block 720—NO), then process 700 may include identifying that the connection should not be handed over (block 730).

While process 700 was described in terms of blocks 705-730, different, additional, or fewer blocks may be used. Furthermore, while blocks 725 and 730 are illustrated as "Identify that connection should be handed over to other RAN" and "Identify that connection should not be handed over," respectively, the information regarding the application invoked by user device 102, analyzed in FIG. 7, may, in some implementations, merely serve as a factor that allows RHS 115 to determine whether to hand over a connection. For example, when RHS 115 determines that the current RAN 105 is not associated with a preferred technology for an invoked application (block 715—NO), and another RAN 105 is available (block 720—YES), RHS 115 may generate a value that indicates that the current RAN 105 is not associated with a preferred technology and that the other RAN 105 is available. However, as described above with respect to block 535 of FIG. 5, this value may be combined with one or more other values in order to ultimately determine whether to hand over the connection to the other RAN 105. Thus, it is possible that a scenario may exist where block 725 is performed, but RHS 115 ultimately foregoes sending an instruction to hand over the connection (block 540 of FIG. 5).

The above-described process may allow user devices 102 that invoke certain applications to connect to RANs 105 that are associated with technologies that are well-suited to serve those applications. These technologies may provide any of a number of benefits, such as lower latency, higher bandwidth, higher quality of service guarantees, lower power consumption at user device 102, etc., than other technologies that are identified as not as well-suited for handling the applications.

FIG. 8 illustrates an example process 800 for identifying whether a connection should be handed over, based on whether a RAN associated with a more preferred technology is available. In one example implementation, process 800 may be performed by RHS 115. Specifically, for example, process 800 may be performed by module 430, described above with respect to FIG. 4. In another example implementation, some or all of process 800 may be performed by a device or collection of devices separate from, or in combination with, module 430 and/or RHS 115.

Process 800 may include identifying a technology via which a user device is connected to a RAN. For example, RHS 115 may identify a technology via which user device 102 is presently connected to a particular RAN 105. RHS 115 may identify the technology based on network administration information (e.g., information received at block 520 of FIG. 5), user device information (e.g., information received at block 505 of FIG. 5), and/or by any other methodology.

Process 800 may further include determining whether a RAN, that is associated with a preferred (or a more preferred) technology, is available (block 810). For example, RHS 115 may store network administration information, that includes a ranked list of technologies. The ranking of the list may be based on information received from a user (e.g., an administrator of RHS 115 and/or an administrator of one or more RANs 105). Additionally, or alternatively, the list may be automatically generated and/or modified based on one or more factors, such as a measured and/or expected quality of service and/or a measured and/or expected bandwidth associated with each of the technologies.

RHS 115 may further base the determination, of whether a preferred RAN 105 is available, on whether user device 102 is in range of one or more RANs 105 identified in the list. RHS 115 may determine whether user device 102 is in range of one or more RANs 105 by comparing a geographic location of user device 102 with geographic location(s) and/or coverage area(s) of the one or more RANs 105.

If a preferred (or a more preferred) technology is available (block 815—YES), then RHS 115 may identify that the connection, between user device 102 and current RAN 105, with which user device 102 is presently connected, should be handed over to the other RAN 105. If, on the other hand, the current RAN 105 is associated with a preferred technology (e.g., a highest-ranked technology) (block 810—YES), then process 800 may include identifying that the connection should not be handed over (block 820).

While process 800 was described in terms of blocks 805-820, different, additional, or fewer blocks may be used. Furthermore, while blocks 815 and 820 are illustrated as "Identify that connection should be handed over to other RAN" and "Identify that connection should not be handed over," respectively, the information regarding the technology via which user device 102 is connected to the current RAN 105, analyzed in FIG. 8, may, in some implementations, merely serve as a factor that allows RHS 115 to determine whether to hand over a connection. For example, when RHS 115 determines that a RAN 105 that is associated with a more preferred technology (block 810—YES), RHS 115 may generate a value that indicates that the other RAN 105 is available. However, as described above with respect to block 535 of FIG. 5, this value may be combined with one or more other values in order to ultimately determine whether to hand over the connection to the other RAN 105. Thus, it is possible that a scenario may exist where block 815 is performed, but RHS 115 ultimately foregoes sending an instruction to hand over the connection (block 540 of FIG. 5).

The above-described process may allow technologies to be prioritized on a system-wide basis. For example, an operator of RHS 115 and/or of one or more RANs 105 may desire to transition out of an older technology, and into a newer technology. In such a scenario, the operator may prioritize the newer technology over the older technology, thus causing more user devices 102 to connect to RANs 105 that correspond to the newer technology.

The device(s) and processes described above allow user devices, which are capable of communicating via multiple technologies, to communicate over the most desirable technologies, as determined by any number of factors. These factors may be weighted (e.g., based on the desires and/or goals of a network operator), and thus allow great flexibility with respect to how these factors determine when a user device should use a specific technology.

The foregoing description of implementations provides illustration and description, but is not intended to be exhaustive or to limit the possible implementations to the precise form disclosed. Modifications and variations are possible in light of the above teachings or may be acquired from practice of the implementations. For example, while series of blocks have been described with regard to FIGS. 5-8, the order of the blocks may be modified in other implementations. Further, non-dependent blocks may be performed in parallel. It will be apparent that embodiments, as described above, may be implemented in many different forms of software, firmware, and hardware in the implementations illustrated in the figures.

Furthermore, while several of the above examples described RANs as each corresponding to one technology, it may be understood that the above-described implementations could be carried out using a RAN that incorporates multiple technologies. For example, a RAN may be associated with an LTE technology and a wi-fi technology. Systems and methods described above may cause a user device, that is connected to the RAN via the LTE technology, to be switched to a connection to the RAN via the wi-fi technology.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
    identifying, by one or more server devices, that a user device is connected to a first radio access network ("RAN"), via a first technology;
    identifying, by the one or more server devices, that the user device is capable of accessing a second RAN, via a second technology,
        the second RAN being different from the first RAN,
        the second technology being different from the first technology;
    determining a set of factors associated with the first RAN and the second RAN, the set of factors including at least two of:
        an amount of congestion associated with the first RAN,
        a position of the first RAN in a priority list that prioritizes a plurality of RANs, or
        a type of an application invoked by the user device; and
    instructing, by the one or more server devices and based on the set of factors associated with the first RAN and the second RAN, the user device to:
        concurrently connect to the first RAN and the second RAN,
        send or receive a first type of traffic via the first RAN while concurrently connected to the first RAN and the second RAN, and
        send or receive a second type of traffic via the second RAN while concurrently connected to the first RAN and the second RAN,
            the second type of traffic being different than the first type of traffic.

2. The method of claim 1, wherein the first type of traffic includes voice call traffic, and wherein the second type of traffic includes data traffic.

3. The method of claim 1, wherein the first technology is a first cellular technology, and wherein the second technology is a second cellular technology.

4. The method of claim 1, further comprising:
receiving an indication that the first RAN is congested,
wherein the instructing is performed based on the received indication that the first RAN is congested.

5. The method of claim 1, further comprising:
receiving an indication that the second RAN is less congested than the first RAN,
wherein the instructing is performed based on the received indication that the second RAN is less congested than the first RAN.

6. The method of claim 1, further comprising:
determining that the user device is not associated with a subscription that indicates that the first technology is preferred over the second technology,
wherein the instructing is performed further based on determining that the user device is not associated with a subscription that indicates that the first technology is preferred over the second technology.

7. The method of claim 1,
wherein the set of factors further include at least a third factor.

8. A system, comprising:
a memory device storing a set of processor-executable instructions; and
one or more processors configured to execute the set of processor-executable instructions, wherein executing the set of processor-executable instructions causes the one or more processors to:
identify that a user device is connected to a first radio access network ("RAN"), via a first technology;
identify that the user device is capable of accessing a second RAN, via a second technology,
the second RAN being different from the first RAN,
the second technology being different from the first technology;
determine a set of factors associated with the first RAN and the second RAN, the set of factors including at least two of:
an amount of congestion associated with the first RAN,
a position of the first RAN in a priority list that prioritizes a plurality of RANs, or
a type of an application invoked by the user device; and
instruct, based on the set of factors associated with the first RAN and the second RAN, the user device to:
concurrently connect to the first RAN and the second RAN,
send or receive a first type of traffic via the first RAN while concurrently connected to the first RAN and the second RAN, and
send or receive a second type of traffic via the second RAN while concurrently connected to the first RAN and the second RAN,
the second type of traffic being different than the first type of traffic.

9. The system of claim 8, wherein the first type of traffic includes voice call traffic, and wherein the second type of traffic includes data traffic.

10. The system of claim 8, wherein the first technology is a first cellular technology, and wherein the second technology is a second cellular technology.

11. The system of claim 8, wherein executing the set of processor-executable instructions further causes the one or more processors to:
receive an indication that the first RAN is congested,
wherein the instructing is performed based on the received indication that the first RAN is congested.

12. The system of claim 8, wherein executing the set of processor-executable instructions further causes the one or more processors to:
receive an indication that the second RAN is less congested than the first RAN,
wherein the instructing is performed based on the received indication that the second RAN is less congested than the first RAN.

13. The system of claim 8, wherein executing the set of processor-executable instructions further causes the one or more processors to:
determine that the user device is not associated with a subscription that indicates that the first technology is preferred over the second technology,
wherein the instructing is performed further based on determining that the user device is not associated with a subscription that indicates that the first technology is preferred over the second technology.

14. The system of claim 8, wherein the set of factors further include at least a third factor.

15. A non-transitory computer-readable medium storing a set of processor-executable instructions, which, when executed by one or more processors, cause the one or more processors to:
identify that a user device is connected to a first radio access network ("RAN"), via a first technology;
identify that the user device is capable of accessing a second RAN, via a second technology,
the second RAN being different from the first RAN,
the second technology being different from the first technology;
determine a set of factors associated with the first RAN and the second RAN, the set of factors including at least two of:
an amount of congestion associated with the first RAN,
a position of the first RAN in a priority list that prioritizes a plurality of RANs, or
a type of an application invoked by the user device; and
instruct, based on the set of factors associated with the first RAN and the second RAN, the user device to:
concurrently connect to the first RAN and the second RAN,
send or receive a first type of traffic via the first RAN while concurrently connected to the first RAN and the second RAN, and
send or receive a second type of traffic via the second RAN while concurrently connected to the first RAN and the second RAN, the second type of traffic being different than the first type of traffic.

16. The non-transitory computer-readable medium of claim 15, wherein the first type of traffic includes voice call traffic, and wherein the second type of traffic includes data traffic.

17. The non-transitory computer-readable medium of claim 15, wherein the first technology is a first cellular technology, and wherein the second technology is a second cellular technology.

18. The non-transitory computer-readable medium of claim 15, wherein executing the set of processor-executable instructions further causes the one or more processors to:
   receive an indication that the first RAN is congested,
      wherein the instructing is performed based on the received indication that the first RAN is congested.

19. The system of claim 15, wherein executing the set of processor-executable instructions further causes the one or more processors to:
   receive an indication that the second RAN is less congested than the first RAN,
      wherein the instructing is performed based on the received indication that the second RAN is less congested than the first RAN.

20. The non-transitory computer-readable medium of claim 15, wherein executing the set of processor-executable instructions further causes the one or more processors to:
   determine that the user device is not associated with a subscription that indicates that the first technology is preferred over the second technology,
   wherein the instructing is performed based on determining that the user device is not associated with a subscription that indicates that the first technology is preferred over the second technology.

* * * * *